United States Patent
Peng et al.

(10) Patent No.: US 9,462,522 B2
(45) Date of Patent: Oct. 4, 2016

(54) METHOD, DEVICE, AND SYSTEM FOR ACQUIRING APPLICATION INFORMATION IN WLAN

(71) Applicant: Huawei Technologies Co., LTD, Shenzhen (CN)

(72) Inventors: Min Peng, Nanjing (CN); Yungui Wang, Nanjing (CN); Yan Zhuang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 13/964,398

(22) Filed: Aug. 12, 2013

(65) Prior Publication Data

US 2014/0119337 A1    May 1, 2014

(30) Foreign Application Priority Data

Oct. 31, 2012  (CN) .......................... 2012 1 0428202

(51) Int. Cl.
*H04W 36/08* (2009.01)
*H04W 4/00* (2009.01)
*H04W 4/04* (2009.01)
*H04W 4/20* (2009.01)

(52) U.S. Cl.
CPC ............. *H04W 36/08* (2013.01); *H04W 4/001* (2013.01); *H04W 4/04* (2013.01); *H04W 4/20* (2013.01)

(58) Field of Classification Search
USPC .......................................... 370/331; 455/436
See application file for complete search history.

(56) References Cited

U.S. PATENT DOCUMENTS

| | | | |
|---|---|---|---|
| 7,558,852 B2 | 7/2009 | Douglas et al. | |
| 2004/0063439 A1 | 4/2004 | Glazko et al. | |
| 2005/0197136 A1 | 9/2005 | Friday et al. | |
| 2005/0207381 A1 | 9/2005 | Aljadeff et al. | |
| 2006/0187873 A1* | 8/2006 | Friday ................... | H04W 48/20 370/328 |
| 2007/0281714 A1* | 12/2007 | Douglas ................ | G01S 5/0252 455/456.1 |
| 2009/0149191 A1* | 6/2009 | Luers .................... | H04W 64/00 455/456.1 |
| 2012/0244875 A1* | 9/2012 | Cardona ............... | G01S 5/0252 455/456.1 |

FOREIGN PATENT DOCUMENTS

RU    2355131 C2    5/2009

OTHER PUBLICATIONS

Ganu Set Al: "Infrastructure-based location estimation in WLAN networks", Wireless Communications and Networking Conference, 2004. WCNC. 2004 IE EE Atlanta, GA, USA Mar. 21-25, 2004, Piscataway, N J, USA, IEEE, vol. 1, Mar. 21, 2004, pp. 465-470, XP010708089, ISBN: 978-0-7803-8344-9.*
Extended European Search Report received in Application No. 13179928.0-1856 mailed Jan. 23, 2014, 6 pages.

(Continued)

*Primary Examiner* — Charles C Jiang
*Assistant Examiner* — Kyaw Z Soe
(74) *Attorney, Agent, or Firm* — Slater Matsil, LLP

(57) ABSTRACT

A method, a device, and a system for acquiring application information in a WLAN are provided by embodiments of the present invention. A controller sends a switch request message to an unassociated neighboring AP. The switch request message includes an identifier of a mobile terminal and a designated channel. The unassociated neighboring AP switches from an original working channel of the unassociated neighboring AP to the designated channel and monitors the mobile terminal according to the identifier of the mobile terminal so as to acquire application information.

6 Claims, 9 Drawing Sheets

A controller sends a switch request message to an unassociated neighboring AP, where the switch request message includes an identifier of a mobile terminal and a designated channel, so that the unassociated neighboring AP switches from an original working channel of the unassociated neighboring AP to the designated channel and monitors the mobile terminal according to the identifier of the mobile terminal to acquire application information — 101

(56) References Cited

OTHER PUBLICATIONS

Ganu, et al., "Infrastructure-based location estimation in WLAN networks," IEEE Communications Society, Date of Conference Mar. 21-25, 2004, 6 pages.

IEEE Standard for Information technology—Telecommunicatoins and information exchange between systems Local and metropolitan area networks—Specific requirements, Part 11: Wireless LAN Medium Access Control (MAC) and Physical Layer (PHY) Specifications, IEEE Computer Society, IEEE Std. 802.11-2012, Mar. 29, 2012, 2793 pages.

IEEE Standard for Information technology—Telecommunications and information exchange between systems—Local and metropolitan area networks—Specific requirements, Part 11: Wireless LAN Medium Access Control (MAC) and Physical Layer (PHY) Specification, Amendment 1: Radio Resource Measurement of Wireless LANs, IEEE Computer Society, IEEE Std. 802.11k-2008, Jun. 12, 2008, 244 pages.

* cited by examiner

METHOD, DEVICE, AND SYSTEM FOR ACQUIRING APPLICATION INFORMATION IN WLAN

CROSS-REFERENCE TO RELATED APPLICATION

This application claims priority to Chinese Patent Application No. 201210428202.7, filed on Oct. 31, 2012, which is hereby incorporated by reference in its entirety.

TECHNICAL FIELD

The present invention relates to the communication field, and in particular, to a method, a device, and a system for acquiring application information in a wireless local area network (wireless local area networks, WLAN).

BACKGROUND

A location service enriches people's life and work by acquiring location information of a mobile terminal quickly and accurately. The location service mainly includes navigation, asset tracking, medical care, and so on. A WLAN location technology is one of location technologies that are widely used. In the WLAN location technology, multiple access points (access point, AP for short) receive a signal of a mobile terminal, each acquire a received signal strength indicator (Received Signal Strength Indicator, RSSI for short), and report the acquired RSSIs to a location server, so that the location server can acquire location information of the mobile terminal according to the RSSIs reported by the multiple APs.

Generally, to locate the mobile terminal, the location server needs to receive RSSIs reported by at least three APs. Certainly, locating is more accurate if RSSIs reported by more APs are received. However, in actual network deployment, to prevent mutual interference of signals between APs, neighboring APs all use non-overlapping channels, for example, in a 2.4 GHz (GigaHertz, GHz for short) WLAN, use channel 1, channel 6, and channel 11. If an associated AP of the mobile terminal works on channel 1, and certainly, the mobile terminal also uses channel 1, neighboring APs of the associated AP work on channel 6 or channel 11, where the associated AP is an AP associated with the mobile terminal, and the mobile terminal accesses the WLAN through the associated AP. Hence, the neighboring APs cannot receive the signal of the mobile terminal, and also cannot acquire the RSSI of the mobile terminal. Therefore, the location server cannot locate the mobile terminal because it is not ensured that the location server can receive enough RSSIs of the mobile terminal reported by APs. In the prior art, the mobile terminal switches channels and sends a message on different channels, so that the neighboring APs of the associated AP can receive the signal of the mobile terminal, thereby ensuring that the location server receives enough RSSIs of the mobile terminal reported by APs; however, generally, not all mobile terminals support channel switching, and the method can be used for locating only after the mobile terminal is improved, and thus cannot implement locating of any mobile terminal.

SUMMARY

Embodiments of the present invention provide a method, a device, and a system for acquiring application information in a WLAN, which may be used for acquiring application information of any mobile terminal in the WLAN.

In a first aspect, a method for acquiring application information in a WLAN is provided, including: sending, by a controller, a switch request message to an unassociated neighboring AP, where the switch request message includes an identifier of a mobile terminal and a designated channel, so that the unassociated neighboring AP switches from an original working channel of the unassociated neighboring AP to the designated channel and monitors the mobile terminal according to the identifier of the mobile terminal so as to acquire application information, where the designated channel is a working channel of the mobile terminal.

In a first possible implementation manner of the first aspect, the method includes: sending, by the controller, an information acquiring request message to an associated AP of the mobile terminal, where the information acquiring request message includes the identifier of the mobile terminal, so that the associated AP sends a probe message to the mobile terminal according to the identifier of the mobile terminal and the mobile terminal sends a response message, thereby acquiring application information.

With reference to the first possible implementation manner of the first aspect, in a second possible implementation manner, the information acquiring request message further includes a probe count, so that the associated AP sends the probe message to the mobile terminal according to the probe count.

With reference to any one of the first aspect and the first to the second possible implementation manner of the first aspect, in a third possible implementation manner, the switch request message further includes a monitoring duration, so that the unassociated neighboring AP switches back from the designated channel to the original working channel of the unassociated neighboring AP after the monitoring duration expires.

With reference to any one of the first aspect and the first to the third possible implementation manner of the first aspect, in a fourth possible implementation manner, before the controller sends the switch request message to the unassociated neighboring AP of the mobile terminal, the method further includes:

receiving, by the controller, a service request message sent by a server, where the service request message includes the identifier of the mobile terminal; and determining the unassociated neighboring AP according to a preset selection condition.

In a second aspect, a method for acquiring application information in a WLAN is provided, including:

receiving a switch request message sent by a controller, where the switch request message includes an identifier of a mobile terminal and a designated channel;

switching from an original working channel to the designated channel, where the designated channel is a working channel of the mobile terminal;

monitoring the mobile terminal according to the identifier of the mobile terminal; and receiving a message sent by the mobile terminal and acquiring application information.

In a first possible implementation manner of the second aspect, the switch request message further includes a monitoring duration; and the method further includes:

switching back from the designated channel to the original working channel after the monitoring duration expires.

With reference to the second aspect or the first possible implementation manner of the second aspect, in a second possible implementation manner, the method further includes: sending the application information to a server, where the application information includes a received signal strength indicator RSSI and the identifier of the mobile terminal.

In a third aspect, a controller is provided, including: a first sending unit, configured to send a switch request message to an unassociated neighboring AP, where the switch request message includes an identifier of a mobile terminal and a designated channel, so that the unassociated neighboring AP switches from an original working channel of the unassociated neighboring AP to the designated channel and monitors the mobile terminal according to the identifier of the mobile terminal so as to acquire application information, where the designated channel is a working channel of the mobile terminal.

In a first possible implementation manner of the third aspect, the first sending unit is further configured to send an information acquiring request message to an associated AP of the mobile terminal, where the information acquiring request message includes the identifier of the mobile terminal, so that the associated AP sends a probe message to the mobile terminal according to the identifier of the mobile terminal and the mobile terminal sends a response message, thereby acquiring application information.

With reference to the third aspect or the first possible implementation manner of the third aspect, in a second possible implementation manner, the controller further includes: a first receiving unit, configured to receive, before the first sending unit sends the switch request message to the unassociated neighboring AP of the mobile terminal, a service request message sent by a server, where the service request message includes the identifier of the mobile terminal; and a first processing unit, configured to determine the unassociated neighboring AP according to a preset selection condition.

In a fourth aspect, an AP is provided, including: a first receiving unit, configured to receive a switch request message sent by a controller, where the switch request message includes an identifier of a mobile terminal and a designated channel; and a first processing unit, configured to switch from an original working channel to the designated channel and monitor the mobile terminal according to the identifier of the mobile terminal, where the designated channel is a working channel of the mobile terminal; where the first receiving unit is further configured to receive, when the first processing unit monitors the mobile terminal, a message sent by the mobile terminal, and acquire application information.

In a first possible implementation manner of the fourth aspect, the switch request message further includes a monitoring duration; and the first processing unit is specifically configured to switch back from the designated channel to the original working channel after the monitoring duration expires.

With reference to the fourth aspect or the first possible implementation manner of the fourth aspect, in a second possible implementation manner, a second receiving unit is configured to receive an information acquiring request message sent by the controller, where the information acquiring request message includes the identifier of the mobile terminal;

a second sending unit is configured to send a probe message to the mobile terminal according to the identifier of the mobile terminal in the information acquiring request message received by the second receiving unit, so that the mobile terminal sends a response message after receiving the probe message; and the second receiving unit is further configured to receive the response message sent by the mobile terminal and acquire application information.

With reference to the second possible implementation manner of the fourth aspect, in a third possible implementation manner, the information acquiring request message further includes a probe count, and the second sending unit is specifically configured to send the probe message to the mobile terminal according to the probe count.

With reference to any one of the fourth aspect and the first to the third possible implementation manner of the fourth aspect, in a fourth possible implementation manner, the AP further includes a sending unit configured to send the application information to a server, where the application information includes a received signal strength indicator RSSI and the identifier of the mobile terminal In a fifth aspect, a system for acquiring application information is provided, including the controller in the third aspect and the AP in the fourth aspect.

In a first possible implementation manner of the fifth aspect, the system further includes a server, configured to send a service request message to the controller, where the service request message includes the identifier of the mobile terminal, and receive application information returned by the AP.

By using the above solutions, an unassociated neighboring AP monitors a mobile terminal by switching to a working channel of an associated AP, and acquires application information after receiving a response message sent by the mobile terminal. By using the solutions, acquiring of application information of any mobile terminal in a WLAN is implemented without the necessity of modifying the mobile terminal.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 14:
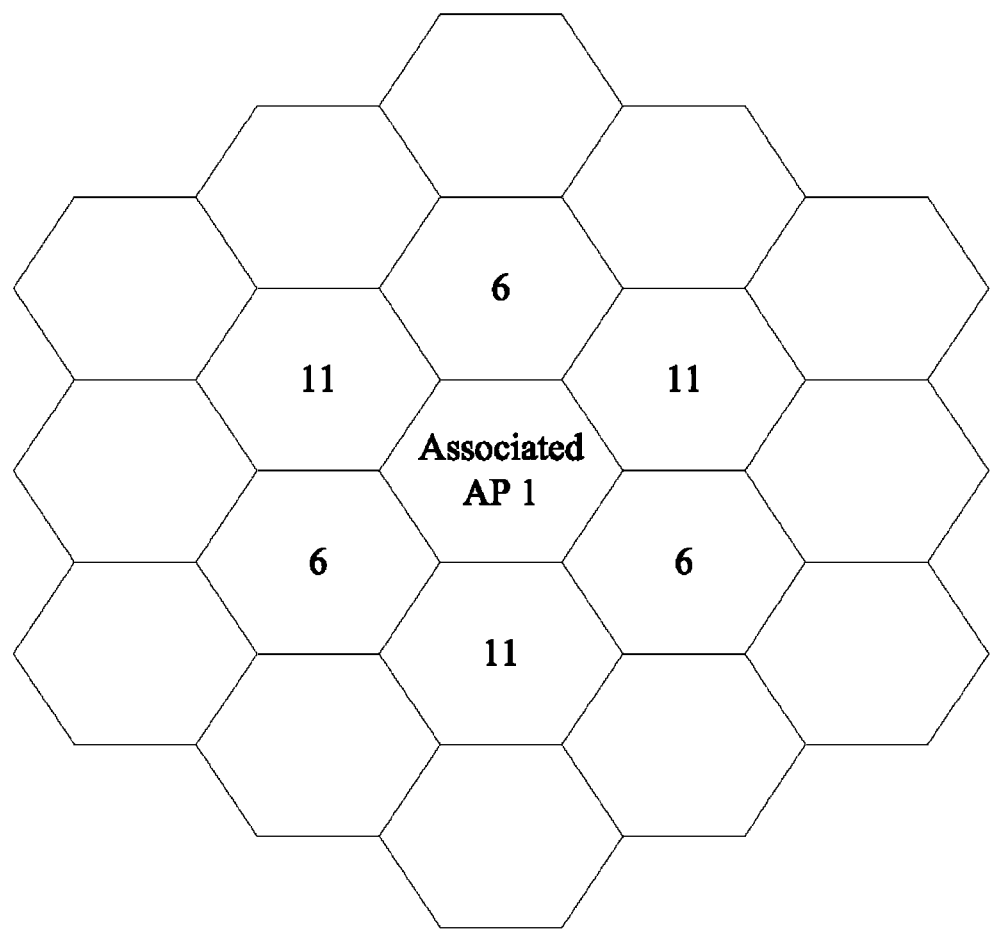
FIG. 14 is a schematic reference diagram of hetero-channel networking according to an embodiment of the present invention.

For ease of description, in the following embodiments, APs neighboring to an associated AP and working on different channels are defined as unassociated neighboring APs. As shown in FIG. 14, each hexagon in FIG. 14 indicates an AP in the hetero-channel networking, where the associated AP works on channel 1, and the APs respectively marked with channel 6 and channel 11 are unassociated neighboring APs. Correspondingly, unassociated non-neighboring APs are unassociated APs that are not neighboring to the associated AP, such as other APs (not marked with channels) except for the associated AP and unassociated neighboring APs in FIG. 14.

Figure 1:
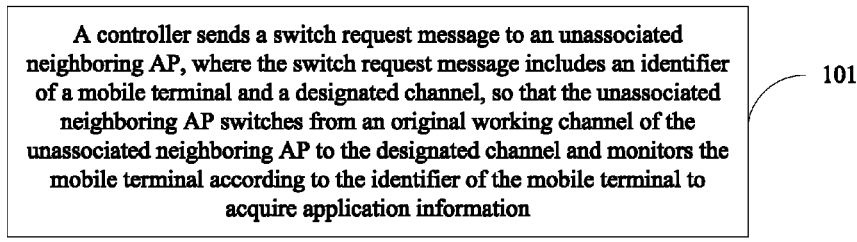
FIG. 1 is a schematic diagram of a method for acquiring application information in a WLAN according to an embodiment of the present invention.

An embodiment of the present invention provides a method for acquiring application information in a WLAN. As shown in FIG. 1, the executor of the method is a controller, and the method includes the following:

101. A controller sends a switch request message to an unassociated neighboring AP, where the switch request message includes an identifier of a mobile terminal and a designated channel, so that the unassociated neighboring AP switches from an original working channel of the unassociated neighboring AP to the designated channel and monitors the mobile terminal according to the identifier of the mobile terminal so as to acquire application information.

The designated channel is a working channel of the mobile terminal.

In this case, because the unassociated neighboring AP in the monitoring state has no information interaction with the mobile terminal, mutual interference between channels may be avoided.

The switch request message may further include a monitoring duration, so that the unassociated neighboring AP switches back from the designated channel to the original working channel of the unassociated neighboring AP after the monitoring duration expires. In this embodiment, to reduce the impact on the service of the unassociated neighboring AP and prevent mutual interference between channels, the unassociated neighboring AP switches back to the original working channel after the unassociated neighboring AP monitors the mobile terminal for a duration.

Further, before the controller sends the switch request message to the unassociated neighboring AP of the mobile terminal, the controller receives a service request message sent by a server.

The service request message includes the identifier of the mobile terminal.

The controller determines the unassociated neighboring AP requiring switching according to a preset selection condition.

Alternatively, the preset selection condition may be a minimum number of unassociated neighboring APs required for implementing the application service by the server, and the unassociated neighboring AP is selected according to the minimum number. For example, in a 2.4 GHz WLAN, when five APs are required to receive information sent by the mobile terminal, if the associated AP of the mobile terminal uses channel 1, and two unassociated non-neighboring APs using channel 1 can also receive the information of the mobile terminal, only two unassociated neighboring APs, instead of all the four unassociated neighboring APs, need to perform channel switching, thereby reducing the impact on the working state of the network. Certainly, to improve locating accuracy, all the four unassociated neighboring APs may perform channel switching. This is not limited by the present invention.

Alternatively, the preset selection condition may be a maximum number of unassociated neighboring APs required for implementing the application service by the server, and the unassociated neighboring AP is selected according to the maximum number. For example, for locating of the mobile terminal, if more APs can acquire location information of the mobile terminal, the mobile terminal can be located better and more accurately; however, considering the impact on the working state (such as the busy degree) of the network, during selection of the unassociated neighboring AP requiring switching, on the premise of not affecting the working state of the network, the maximum number of unassociated neighboring APs are selected for channel switching.

It should be noted that during the selection of unassociated neighboring APs requiring switching, preferentially idle unassociated neighboring APs are selected for switching to further reduce the impact on the working state of the network; in addition, to locate the mobile terminal, preferentially unassociated neighboring APs distributed in different directions of the associated AP should be selected, in order to avoid selecting unassociated neighboring APs centralized in one direction of the associated AP and improve locating accuracy.

In addition, in the scenario of locating the mobile terminal, the server may be a location server. The location server acquires the application information from a message received from the AP and locates the mobile terminal, where the application information includes the location information.

Further, the controller sends an information acquiring request message to the associated AP of the mobile terminal, where the information acquiring request message includes the identifier of the mobile terminal, so that the associated AP sends a probe message to the mobile terminal according to the identifier of the mobile terminal and the mobile terminal sends a response message, thereby acquiring application information.

The probe message may be a data frame, a control frame, or a management frame.

Preferentially, the information acquiring request message further includes a probe count, so that the associated AP sends the probe message to the mobile terminal according to the probe count.

Specifically, after receiving the information acquiring request message, the associated AP sends a probe message to the mobile terminal; after receiving the probe message, the mobile terminal sends a response message to the associated AP; in this case, if the unassociated neighboring AP has switched to the working channel of the associated AP and is in the monitoring state, because the unassociated neighboring AP and the associated AP work on the same channel, the unassociated neighboring AP also receives the response message sent by the mobile terminal. To ensure that the unassociated neighboring AP after channel switching can acquire the application information of the mobile terminal, the associated AP sends a probe message to the mobile terminal according to the probe count in the information acquiring request message, and the mobile terminal sends a response message to the associated AP every time when receiving a probe message. If the associated AP and the unassociated neighboring AP after channel switching receive multiple response messages from the mobile terminal, more application information is acquired and reported to the server. For example, in the scenario of locating the mobile terminal, by sending a probe message for multiple times, it is ensured that both the associated AP and the unassociated neighboring AP after channel switching can acquire at least one RSSI according to the response message and report the acquired RSSI to the location server, so that the location server locates the mobile terminal more accurately; if each AP acquires multiple RSSIs and reports the RSSIs to the location server, locating accuracy may be further improved. It should be noted that considering the actual working state of the network (such as the busy degree of the network), with respect to the setting of the probe count for the associated AP to send a probe message to the mobile terminal, a larger value is preferred, on the premise of not affecting the working state of the network.

Alternatively, the controller may further first send a service message on the working channel of the associated AP after receiving the service request message, where the service message includes the identifier of the mobile terminal, and the APs receiving the service message include the associated AP and unassociated non-neighboring APs working on the same channel as the associated AP. The APs receiving the service message acquire application information according to the service message and send the application information to the server. The server sends a notification message to the controller when determining that the amount of received application information is insufficient, so that the controller initiates a switching process of the unassociated neighboring AP, thereby ensuring that the server receives sufficient application information used for the application service, where the notification message may include the number of switching APs or a list of switching APs (indicating the switching APs). For example, in the scenario of locating the mobile terminal, the controller receives a location request message sent by the location server and sends a location message on the working channel of the associated AP; the APs receiving the location message acquire location information according to the location message and send the location information to the location server. In this case, if the location server determines that the amount of received location information cannot determine the location of the mobile terminal, the location server sends a notification message to the controller, so that the controller sends a switch request message to the unassociated neighboring AP. The unassociated neighboring AP enters the monitoring state after switching to the working channel of the associated AP, and acquires location information after monitoring a response message of the mobile terminal, and sends the location information to the location server. Thereby, the location server acquires sufficient location information to locate the mobile terminal.

By using the above method where the executor is a controller, the controller sends a switch request message to an unassociated neighboring AP, so that the unassociated neighboring AP switches to the same channel as an associated AP, monitors a mobile terminal, and acquires application information after receiving a response message sent by the mobile terminal. By using the solution, acquiring of application information of any mobile terminal in a WLAN is implemented without the necessity of modifying the mobile terminal.

Figure 2:
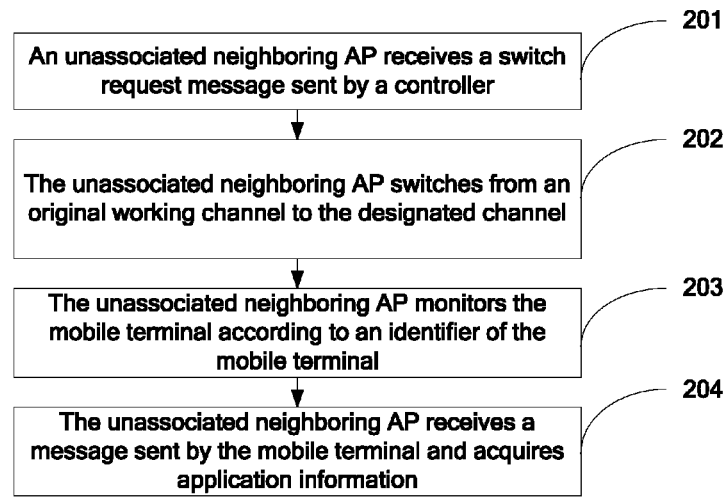
FIG. 2 is a schematic diagram of another method for acquiring application information in a WLAN according to an embodiment of the present invention.

An embodiment of the present invention provides a method for acquiring application information in a WLAN. As shown in FIG. 2, the method includes the following:

201. An unassociated neighboring AP receives a switch request message sent by a controller.

The switch request message includes an identifier of a mobile terminal and a designated channel, where the designated channel is a working channel of an associated AP.

202. The unassociated neighboring AP switches from an original working channel to the designated channel.

Further, the switch request message further includes a monitoring duration, so that the unassociated neighboring AP switches back from the designated channel to the original working channel after the monitoring duration expires. In this embodiment, to reduce the impact on the service of the unassociated neighboring AP and prevent mutual interference between channels, the unassociated neighboring AP switches back to the original working channel after the unassociated neighboring AP monitors the mobile terminal for a duration.

203. The unassociated neighboring AP monitors the mobile terminal according to the identifier of the mobile terminal.

204. The unassociated neighboring AP receives a message sent by the mobile terminal and acquires application information.

In this case, because the unassociated neighboring AP works on the same channel as the associated AP, the unassociated neighboring AP may also receive the message sent by the mobile terminal and therefore acquire application information.

In addition, because the AP in the monitoring state has no information interaction with the mobile terminal, mutual interference between channels is avoided.

Further, the unassociated neighboring AP sends the application information to a server, where the application information includes: an RSSI and the identifier of the mobile terminal.

Specifically, the sending, by the unassociated neighboring AP, the application information to the server includes the following two modes:

Mode 1: The unassociated neighboring AP sends the application information acquired in the monitoring state to the server when the monitoring ends (for example, the monitoring duration expires); this mode applies to a scenario where little application information is acquired in the monitoring state.

Mode 2: The unassociated neighboring AP sends the acquired application information to the server in the monitoring process; this mode applies to a scenario where a lot of application information is acquired in the monitoring state. For example, when cumulative application information acquired reaches 100 pieces, the unassociated neighboring AP sends the 100 pieces of application information to the server; and when cumulative application information acquired by the unassociated neighboring AP reaches 100 pieces again, sends the 100 pieces of application information subsequently acquired to the server, which is only used as an example for description, and is not limited by this embodiment of the present invention.

It should be noted that, in the scenario of locating the mobile terminal, the server may be a location server. The location server acquires location information from a message received from the AP and locates the mobile terminal, where the application information includes the location information.

By using the above method, an unassociated neighboring AP switches to a working channel of an associated AP by receiving a switch request message from a controller, and monitors a mobile terminal, and acquires application information after receiving a response message sent by the mobile terminal. By using the solution, acquiring of application information of any mobile terminal in a WLAN is implemented without the necessity of modifying the mobile terminal.

An embodiment of the present invention provides a method for acquiring application information in a WLAN. As shown in the schematic diagram of information interaction in FIG. 3, this embodiment is used for locating the mobile terminal. This embodiment is described by using a location server as an example of a server, and the method includes the following:

S301. A location server sends a location request message to a controller.

The location request message includes an identifier of a mobile terminal, for notifying the controller of the mobile terminal that needs to be located.

S302. The controller sends a switch request message to an unassociated neighboring AP after receiving the location request message.

The switch request message includes the identifier of the mobile terminal and a designated channel. The designated channel is a working channel of the mobile terminal.

It should be noted that the controller sends a switch request message to a certain number of unassociated neighboring APs, where the certain number of unassociated neighboring APs can implement locating of the mobile terminal. For example, if the location server requires application information sent by n APs to locate the mobile terminal, the controller may send the switch request message to n−1 unassociated neighboring APs. Certainly, the mobile terminal is located more accurately if more application information is received by the location server.

S303. The controller sends an information acquiring request message to an associated AP after receiving the location request message.

It should be noted that step S302 and step S303 are not limited to any absolute sequence, that is, step S303 may be performed before step S302, or step S302 and step S303 may be performed at the same time.

S304. The unassociated neighboring AP switches from an original working channel to the designated channel after receiving the switch request message.

Further, the switch request message further includes a monitoring duration, so that the unassociated neighboring AP switches back from the designated channel to the original channel after the monitoring duration expires. In this embodiment, to reduce the impact on the service of the unassociated neighboring AP and prevent mutual interference between channels, the unassociated neighboring AP switches back to the original working channel after the unassociated neighboring AP monitors the mobile terminal for a duration.

S305. The unassociated neighboring AP monitors the mobile terminal according to the identifier of the mobile terminal.

In this case, because the AP in the monitoring state has no information interaction with the mobile terminal, mutual interference between channels is avoided.

S306. After receiving the information acquiring request message, the associated AP sends a probe message to the mobile terminal according to the identifier of the mobile terminal in the information acquiring request message.

The probe message may be a data frame, a control frame, or a management frame.

Preferentially, the information acquiring request message further includes a probe count, so that the associated AP sends the probe message to the mobile terminal according to the probe count.

Specifically, after receiving the information acquiring request message, the associated AP sends a probe message to the mobile terminal; after receiving the probe message, the mobile terminal sends a response message to the associated AP; in this case, if the unassociated neighboring AP has switched to the working channel of the associated AP and is in the monitoring state, because the unassociated neighboring AP and the associated AP work on the same channel, the unassociated neighboring AP also receives the response message sent by the mobile terminal. To ensure that the unassociated neighboring AP after channel switching can acquire the application information of the mobile terminal, the associated AP sends a probe message to the mobile terminal according to the probe count in the information acquiring request message, and the mobile terminal sends a response message to the associated AP every time when receiving a probe message. If the associated AP and the unassociated neighboring AP after channel switching receive multiple response messages from the mobile terminal, more application information is acquired and reported to the server. For example, in the scenario of locating the mobile terminal, by sending a probe message for multiple times, it is ensured that both the associated AP and the unassociated neighboring AP after channel switching can acquire at least one RSSI according to the response message and report the acquired RSSI to the location server, so that the location server locates the mobile terminal more accurately; if each AP acquires multiple RSSIs and reports the RSSIs to the location server, locating accuracy may be further improved. It should be noted that considering the actual working state of the network (such as the busy degree of the network), with respect to the setting of the probe count for the associated AP to send a probe message to the mobile terminal, a larger value is preferred, on the premise of not affecting the working state of the network.

S307. The mobile terminal sends a response message on the designated channel after receiving the probe message.

To ensure that each AP acquires more application information, the associated AP repeatedly sends the probe message to the mobile terminal according to the probe count in the information acquiring request message, and the mobile terminal sends a response message every time when receiving a probe message.

S308. The associated AP and the unassociated neighboring AP after channel switching receive the response message and acquire application information according to the response message, and send the application information to the location server.

The application information includes an RSSI and the identifier of the mobile terminal, and the application message includes location information.

The associated AP receives response messages, the number of which is equal to the probe count, and acquires application information according to the response messages; if the unassociated neighboring AP has switched to the working channel of the associated AP and is in the monitoring state, the unassociated neighboring AP after channel switching also receives the response messages and acquires application information.

S309. The location server locates the mobile terminal according to the application information.

It should be noted that the above method embodiment is described as a series of action combinations for simple description. However, those skilled in the art should know that the present invention is not limited to the described action sequence. In addition, those skilled in the art should know that the embodiments in the specification are exemplary embodiments and those actions and modules involved in these embodiments are not necessary for the present invention.

By using the above method, in the scenario of locating the mobile terminal, the unassociated neighboring AP switches to the working channel of the associated AP by receiving a switch request message from the controller, and monitors the mobile terminal, and acquires application information after receiving the response message sent by the mobile terminal. By using the solution, acquiring of application information of any mobile terminal in a WLAN is implemented without the necessity of modifying the mobile terminal, and the mobile terminal is located accurately.

Figure 4:
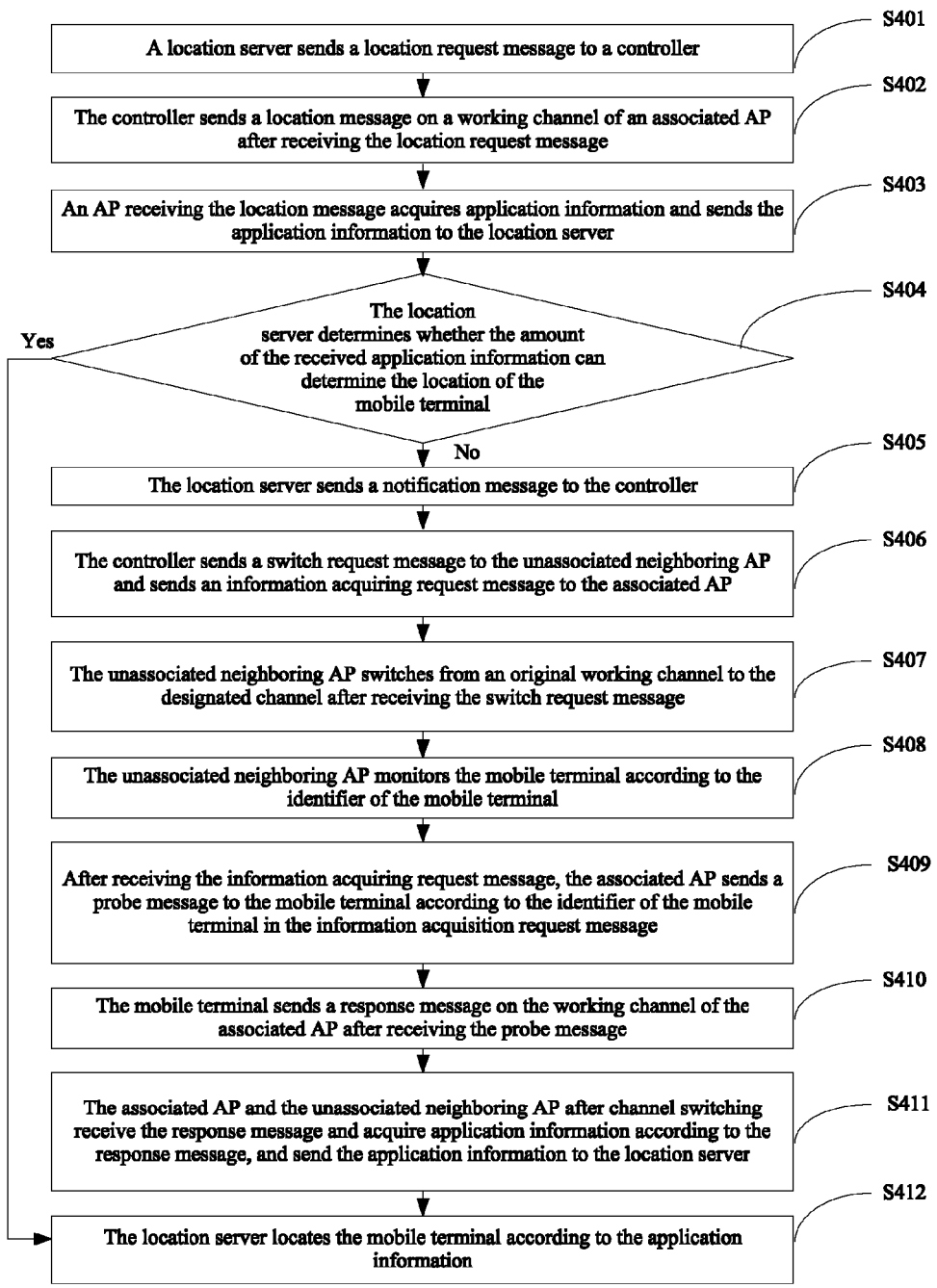
FIG. 4 is a schematic flowchart of another method for acquiring application information in a WLAN according to an embodiment of the present invention.

An embodiment of the present invention provides a method for acquiring application information in a WLAN. As shown in FIG. 4, this embodiment is used for locating the mobile terminal. This embodiment is described by using a location server as an example of a server, and the method includes the following:

S401. A location server sends a location request message to a controller.

The location request message includes an identifier of a mobile terminal, for notifying the controller of the mobile terminal that needs to be located.

S402. The controller sends a location message on a working channel of an associated AP after receiving the location request message.

The location message includes the identifier of the mobile terminal.

S403. An AP receiving the location message acquires application information and sends the application information to the location server.

The application information includes location information.

S404. The location server determines whether the amount of the received application information can determine the location of the mobile terminal.

If not, the location server executes step S405 to step S412. If so, the location server executes step S412.

S405. The location server sends a notification message to the controller.

The notification message includes the number of switching APs or a list of switching APs (indicating the switching APs).

S406. The controller sends a switch request message to the unassociated neighboring AP and sends an information acquiring request message to the associated AP.

The switch request message includes the identifier of the mobile terminal and a designated channel.

S407. The unassociated neighboring AP switches from an original working channel to the designated channel after receiving the switch request message.

Further, the switch request message further includes a monitoring duration, so that the unassociated neighboring AP switches back from the designated channel to the original channel after the monitoring duration expires. In this embodiment, to reduce the impact on the service of the unassociated neighboring AP and prevent mutual interference between channels, the unassociated neighboring AP switches back to the original working channel after the unassociated neighboring AP monitors the mobile terminal for a duration.

S408. The unassociated neighboring AP monitors the mobile terminal according to the identifier of the mobile terminal.

In this case, because the AP in the monitoring state has no information interaction with the mobile terminal, mutual interference between channels is avoided.

S409. After receiving the information acquiring request message, the associated AP sends a probe message to the mobile terminal according to the identifier of the mobile terminal in the information acquiring request message.

The probe message may be a data frame, a control frame, or a management frame.

Preferentially, the information acquiring request message further includes a probe count, so that the associated AP sends the probe message to the mobile terminal according to the probe count.

Specifically, after receiving the information acquiring request message, the associated AP sends a probe message to the mobile terminal; after receiving the probe message, the mobile terminal sends a response message to the associated AP; in this case, if the unassociated neighboring AP has switched to the working channel of the associated AP and is in the monitoring state, because the unassociated neighboring AP and the associated AP work on the same channel, the unassociated neighboring AP also receives the response message sent by the mobile terminal. To ensure that the unassociated neighboring AP after channel switching can acquire the application information of the mobile terminal, the associated AP sends a probe message to the mobile terminal according to the probe count in the information acquiring request message, and the mobile terminal sends a response message to the associated AP every time when receiving a probe message. If the associated AP and the unassociated neighboring AP after channel switching receive multiple response messages from the mobile terminal, more application information is acquired and reported to the server. For example, in the scenario of locating the mobile terminal, by sending a probe message for multiple times, it is ensured that both the associated AP and the unassociated neighboring AP after channel switching can acquire at least one RSSI according to the response message and report the acquired RSSI to the location server, so that the location server locates the mobile terminal more accurately; if each AP acquires multiple RSSIs and reports the RSSIs to the location server, locating accuracy may be further improved. It should be noted that considering the actual working state of the network (such as the busy degree of the network), with respect to the setting of the probe count for the associated AP to send a probe message to the mobile terminal, a larger value is preferred, on the premise of not affecting the working state of the network.

S410. The mobile terminal sends a response message on the working channel of the associated AP after receiving the probe message.

To ensure that each AP acquires more application information, the associated AP repeatedly sends a probe message to the mobile terminal according to the probe count in the information acquiring request message, and the mobile terminal sends a response message on the working channel of the associated AP every time when receiving a probe message.

S411. The associated AP and the unassociated neighboring AP after channel switching receive the response message and acquire application information according to the response message, and send the application information to the location server.

The application information includes the identifier of the mobile terminal and an RSSI.

The associated AP receives response messages, the number of which is equal to the probe count, and acquires application information according to the response messages; if the unassociated neighboring AP has switched to the working channel of the associated AP and is in the monitoring state, the unassociated neighboring AP after channel switching also receives the response messages and acquires application information.

S412. The location server locates the mobile terminal according to the application information.

It should be noted that the above method embodiment is described as a series of action combinations for simple description. However, those skilled in the art should know that the present invention is not limited to the described action sequence. In addition, those skilled in the art should know that the embodiments in the specification are exemplary embodiments and those actions and modules involved in these embodiments are not necessary for the present invention.

By using the above method, when determining that the amount of received application information is insufficient, a location server sends a notification message to a controller. An unassociated neighboring AP receives a switch request message sent by the controller, thereby switching to a working channel of an associated AP, monitors a mobile terminal, and acquires the application information after receiving the response message sent by the mobile terminal. By using the solution, acquiring of application information of any mobile terminal in a WLAN is implemented without the necessity of modifying the mobile terminal, and the mobile terminal is located accurately.

Figure 5:
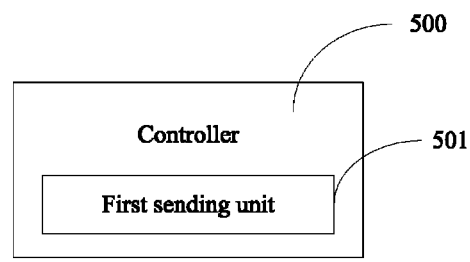
FIG. 5 is a schematic structural diagram of a controller according to an embodiment of the present invention.

An embodiment of the present invention provides a controller 500, as shown in FIG. 5, including:

a first sending unit 501, configured to send a switch request message to an unassociated neighboring AP, where the switch request message includes an identifier of a mobile terminal and a designated channel, so that the unassociated neighboring AP switches from an original working channel of the unassociated neighboring AP to the designated channel and monitors the mobile terminal according to the identifier of the mobile terminal so as to acquire application information.

The designated channel is a working channel of the mobile terminal.

In this case, because the AP in the monitoring state has no information interaction with the mobile terminal, mutual interference between channels is avoided.

The switch request message further includes a monitoring duration, so that the unassociated neighboring AP switches back from the designated channel to the original working channel after the monitoring duration expires. In this embodiment, to reduce the impact on the service of the unassociated neighboring AP and prevent mutual interference between channels, the unassociated neighboring AP switches back to the original working channel after the unassociated neighboring AP monitors the mobile terminal for a duration.

Figure 6:
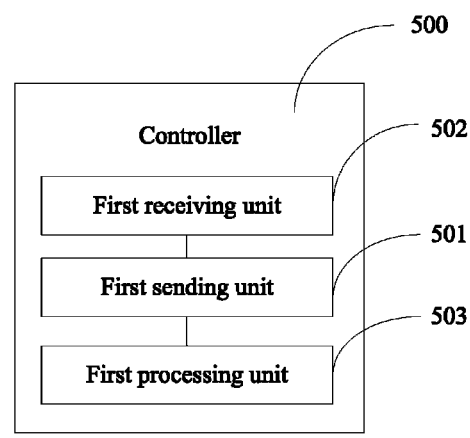
FIG. 6 is a schematic structural diagram of another controller according to an embodiment of the present invention.

Further, as shown in FIG. 6, the controller 500 includes:

a first receiving unit 502, configured to receive, before the first sending unit 501 sends the switch request message to the unassociated neighboring AP of the mobile terminal, a service request message sent by a server, where the service request message includes the identifier of the mobile terminal; and a first processing unit 503, configured to determine the unassociated neighboring AP according to a preset selection condition.

Alternatively, the preset selection condition may be a minimum number of unassociated neighboring APs required for implementing the application service by the server and the unassociated neighboring AP is selected according to the minimum number. For example, in a 2.4 GHz WLAN, when five APs are required to receive information sent by the mobile terminal, if the associated AP of the mobile terminal uses channel 1, and two unassociated non-neighboring APs using channel 1 can also receive the information of the mobile terminal, only two unassociated neighboring APs, instead of all the four unassociated neighboring APs, need to perform channel switching, thereby reducing the impact on the working state of the network. Certainly, to improve locating accuracy, all the four unassociated neighboring APs may perform channel switching. This is not limited by the present invention.

Alternatively, the preset selection condition may be a maximum number of unassociated neighboring APs required for implementing the application service by the server and the unassociated neighboring AP is selected according to the maximum number. For example, for locating of the mobile terminal, if more APs can acquire location information of the mobile terminal, the mobile terminal can be located better and more accurately; however, considering the impact on the working state (such as the busy degree) of the network, during selection of the unassociated neighboring AP requiring switching, on the premise of not affecting the working state of the network, the maximum number of unassociated neighboring APs are selected for channel switching.

It should be noted that during the selection of unassociated neighboring APs requiring switching, preferentially idle unassociated neighboring APs are selected for network switching to further reduce the impact on the working state of the network; in addition, to locate the mobile terminal, preferentially unassociated neighboring APs distributed in different directions of the associated AP should be selected, in order to avoid selecting unassociated neighboring APs centralized in one direction of the associated AP and improve locating accuracy.

Further, the first sending unit 501 is further configured to send an information acquiring request message to the associated AP of the mobile terminal, where the information acquiring request message includes the identifier of the mobile terminal, so that the associated AP sends a probe message to the mobile terminal according to the identifier of the mobile terminal and the mobile terminal sends a response message, thereby acquiring application information.

The probe message may be a data frame, a control frame, or a management frame.

Preferentially, the information acquiring request message further includes a probe count, so that the associated AP sends the probe message to the mobile terminal according to the probe count.

Specifically, after receiving the information acquiring request message, the associated AP sends a probe message to the mobile terminal; after receiving the probe message, the mobile terminal sends a response message to the associated AP; in this case, if the unassociated neighboring AP has switched to the working channel of the associated AP and is in the monitoring state, because the unassociated neighboring AP and the associated AP work on the same channel, the unassociated neighboring AP also receives the response message sent by the mobile terminal. To ensure that the unassociated neighboring AP after channel switching can acquire the application information of the mobile terminal, the associated AP sends a probe message to the mobile terminal according to the probe count in the information acquiring request message, and the mobile terminal sends a response message to the associated AP every time when receiving a probe message. If the associated AP and the unassociated neighboring AP after channel switching receive multiple response messages from the mobile terminal, more application information is acquired and reported to the server. For example, in the scenario of locating the mobile terminal, by sending a probe message for multiple times, it is ensured that both the associated AP and the unassociated neighboring AP after channel switching can acquire at least one RSSI according to the response message and report the acquired RSSI to the location server, so that the location server locates the mobile terminal more accurately; if each AP acquires multiple RSSIs and reports the RSSIs to the location server, locating accuracy may be further improved. It should be noted that considering the actual working state of the network (such as the busy degree of the network), with respect to the setting of the probe count for the associated AP to send a probe message to the mobile terminal, a larger value is preferred, on the premise of not affecting the working state of the network.

It should be noted that those skilled in the art may clearly understand that the specific working process of the controller may refer to the corresponding process provided in the method embodiment in FIG. 1 and is not further described herein.

The embodiment of the present invention provides a controller. The controller sends a switch request message to an unassociated neighboring AP, so that the unassociated neighboring AP monitors a mobile terminal by switching to the working channel of an associated AP, and acquires application information after receiving a response message sent by the mobile terminal. By using the solution, acquiring of application information of any mobile terminal in a WLAN is implemented without the necessity of modifying the mobile terminal.

Figure 7:
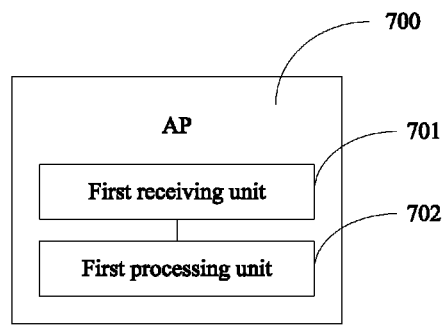
FIG. 7 is a schematic structural diagram of an AP according to an embodiment of the present invention.

An embodiment of the present invention provides an AP 700. As shown in FIG. 7, when the AP is used as an unassociated neighboring AP, the AP includes:

a first receiving unit 701, configured to receive a switch request message sent by a controller, where the switch request message includes an identifier of a mobile terminal and a designated channel, and the switch request message includes the identifier of the mobile terminal and a channel identifier corresponding to an associated AP; and a first processing unit 702, configured to switch from an original working channel to the designated channel and monitor the mobile terminal according to the identifier of the mobile terminal, where the designated channel is a working channel of the mobile terminal; where the first receiving unit 701 is further configured to receive a message sent by the mobile terminal, and acquire application information, when the first processing unit 702 monitors the mobile terminal.

In this case, because the AP in the monitoring state has no information interaction with the mobile terminal, mutual interference between channels is avoided.

Figure 8:
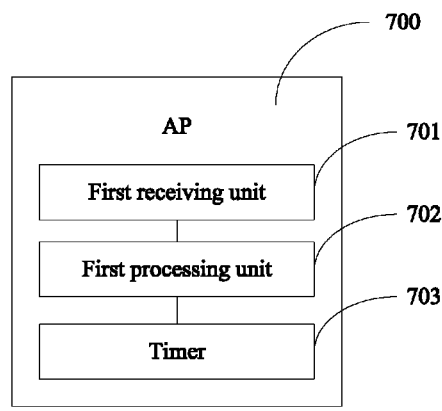
FIG. 8 is a schematic structural diagram of another AP according to an embodiment of the present invention.

Further, the switch request message further includes a monitoring duration. As shown in FIG. 8, the AP further includes a timer 703, configured to record the monitoring duration, and start when the first processing unit 702 starts to monitor the mobile terminal, and stop when the monitoring duration is reached.

The first processing unit 702 is specifically configured to switch from the designated channel to the original working channel after the timer 703 reaches the monitoring duration.

It should be noted that, in the scenario of locating the mobile terminal, the server may be a location server. The location server acquires location information from a message received from the AP and locates the mobile terminal, where the application information includes the location information.

Figure 9:
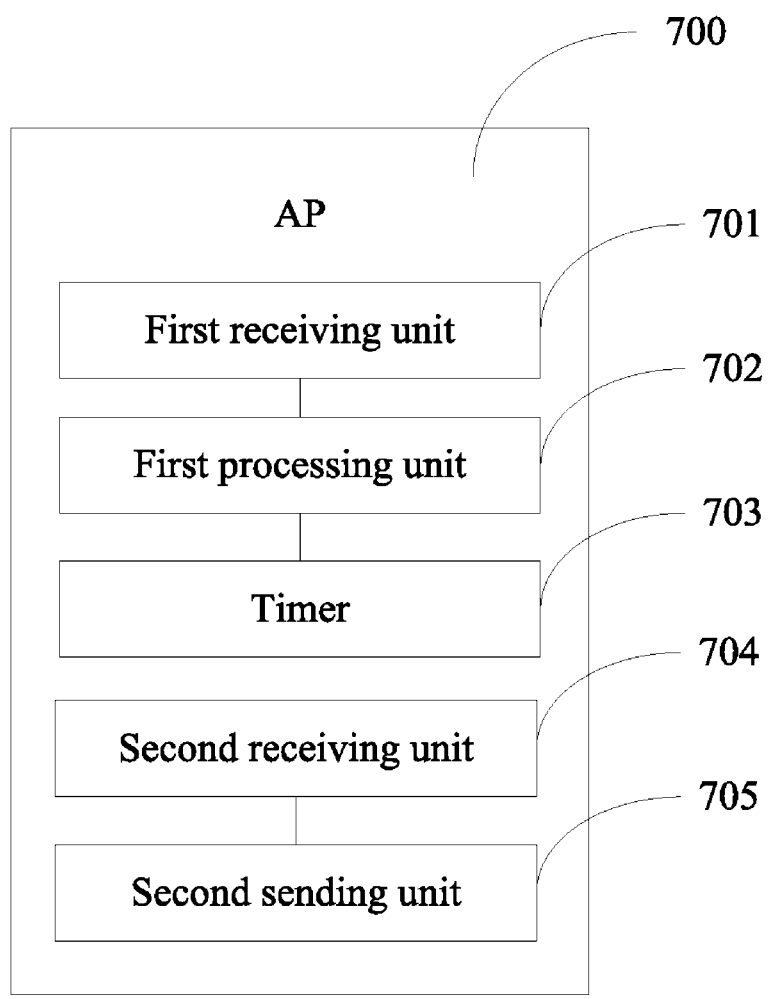
FIG. 9 is a schematic structural diagram of another AP according to an embodiment of the present invention.

Further, as shown in FIG. 9, when the AP is used as an associated AP, the AP 700 includes:

a second receiving unit 704, configured to receive an information acquiring request message sent by the controller, where:

the service information acquiring request message includes the identifier of the mobile terminal; and a second sending unit 705, configured to send a probe message to the mobile terminal according to the identifier of the mobile terminal in the information acquiring request message received by the second receiving unit 704, so that the mobile terminal sends a response message after receiving the probe message; where:

the second receiving unit 704 is further configured to receive the response message sent by the mobile terminal and acquire application information.

Further, the information acquiring request message includes a probe count, and the second sending unit 705 is specifically configured to send the probe message to the mobile terminal according to the probe count.

Specifically, the AP may include a counter, configured to record the probe count. The counter starts to count when the second sending unit 705 sends a probe message for the first time; every time when the second sending unit 705 sends a probe message, the counter counts one time until the probe count is full.

The probe message may be a data frame, a control frame, or a management frame.

Figure 10:
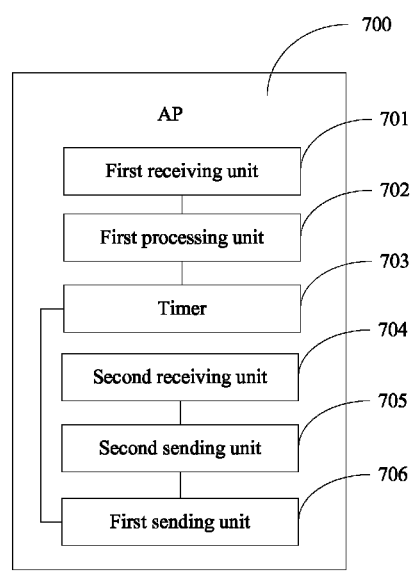
FIG. 10 is a schematic structural diagram of another AP according to an embodiment of the present invention.

Further, as shown in FIG. 10, the AP includes a first sending unit 706, configured to send the application information to the server.

The application information includes an RSSI and the identifier of the mobile terminal.

Specifically, the sending, by the first sending unit 706, the application information to the server includes the following two modes:

Mode 1: The first sending unit 706 sends the application information acquired in the monitoring state to the server when the monitoring ends (for example, the monitoring duration expires); this mode applies to a scenario where little application information is acquired in the monitoring state.

Mode 2: The first sending unit 706 sends the acquired application information to the server in the monitoring process; this mode applies to a scenario where a lot of application information is acquired in the monitoring state. For example, when cumulative application information acquired reaches 100 pieces, the unassociated neighboring AP sends the 100 pieces of application information to the server; and when cumulative application information acquired by the unassociated neighboring AP reaches 100 pieces again, sends the 100 pieces of application information subsequently acquired to the server, which is only used as an example for description, and is not limited by this embodiment of the present invention.

Figure 3:
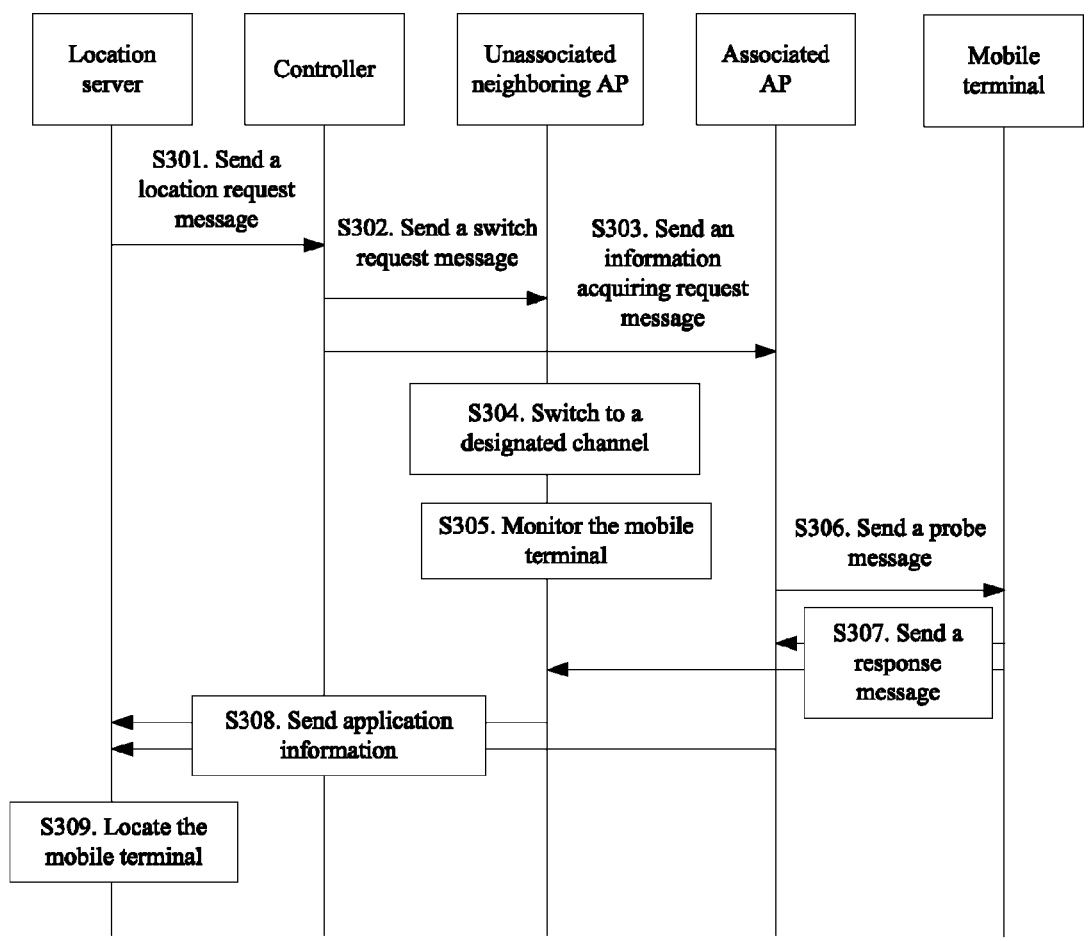
FIG. 3 is a schematic flowchart of another method for acquiring application information in a WLAN according to an embodiment of the present invention.

It should be noted that those skilled in the art may clearly understand that the specific working process of the AP may refer to the corresponding process provided in the method embodiments in FIG. 2 and FIG. 3 and is not further described herein.

By using the AP provided by the embodiment of the present invention, acquiring of application information of any mobile terminal in a WLAN is implemented without the necessity of modifying the mobile terminal.

Figure 11:
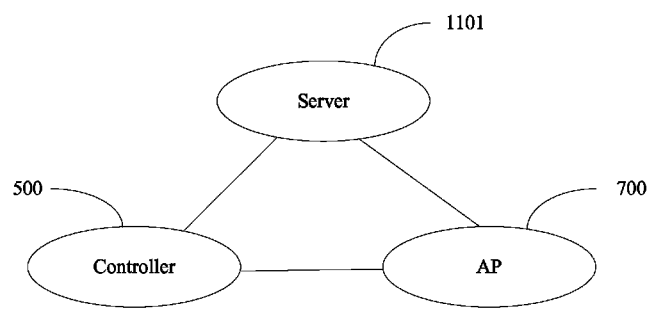
FIG. 11 is a schematic diagram of a system according to an embodiment of the present invention.

An embodiment of the present invention provides a system for acquiring application information. As shown in FIG. 11, the system includes: the controller 500 in FIG. 5 and the AP 700 described in any one of FIG. 7 to FIG. 10.

The system further includes a server 1101, configured to send a service request message to the controller 500, where the service request message includes an identifier of a mobile terminal, and receive application information returned by the AP 700.

It should be noted that the AP and the server may be integrated in an access controller (Access Controller, AC).

In addition, the server may be a location server.

By using the system provided by the embodiment of the present invention, a controller sends a switch request message to an unassociated neighboring AP, so that the unassociated neighboring AP switches to the same channel as an associated AP, thereby monitoring a mobile terminal, and acquires application information after receiving a response message sent by the mobile terminal. Thereby acquiring of application information of any mobile terminal in a WLAN is implemented without the necessity of modifying the mobile terminal.

Figure 12:
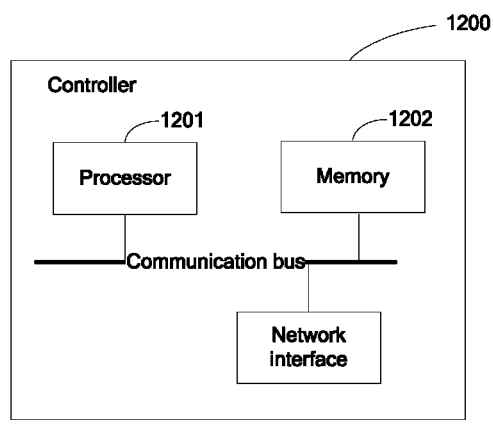
FIG. 12 is a schematic structural diagram of a controller according to an embodiment of the present invention.

FIG. 12 is a schematic structural diagram of a controller according to an embodiment of the present invention. As shown in FIG. 12, the controller 1200 includes a processor 1201 and a memory 1202. The processor 1201 and the memory 1202 may be connected by a bus or in other modes, and the memory 1202 stores program codes, where the program codes include operation instructions of a computer.

The processor 1201 executes the program codes, and is configured to send a switch request message to an unassociated neighboring AP, where the switch request message includes an identifier of a mobile terminal and a designated channel, so that the unassociated neighboring AP switches from an original working channel of the unassociated neighboring AP to the designated channel and monitors the mobile terminal according to the identifier of the mobile terminal so as to acquire application information.

The designated channel is a working channel of the mobile terminal.

In this case, because the AP in the monitoring state has no information interaction with the mobile terminal, mutual interference between channels is avoided.

The switch request message further includes a monitoring duration, so that the unassociated neighboring AP switches back from the designated channel to the original working channel of the unassociated neighboring AP after the monitoring duration expires. In this embodiment, to reduce the impact on the service of the unassociated neighboring AP and prevent mutual interference between channels, the unassociated neighboring AP switches back to the original working channel after the unassociated neighboring AP monitors the mobile terminal for a duration.

The processor 1201 is specifically configured to send an information acquiring request message to an associated AP of the mobile terminal, where the information acquiring request message includes the identifier of the mobile terminal, so that the associated AP sends a probe message to the mobile terminal according to the identifier of the mobile terminal and the mobile terminal sends a response message, thereby acquiring application information.

Alternatively, the information acquiring request message further includes a probe count, so that the associated AP sends the probe message to the mobile terminal according to the probe count.

The probe message may be a data frame, a control frame, or a management frame.

The processor 1201 is further configured to receive, before the switch request message is sent to the unassociated neighboring AP of the mobile terminal, a service request message sent by the server, where the service request message includes the identifier of the mobile terminal, and determines an unassociated neighboring AP requiring switching according to a preset selection condition.

Alternatively, the preset selection condition may be a minimum number of unassociated neighboring APs required for implementing the application service by the server and the unassociated neighboring AP is selected according to the minimum number. For example, in a 2.4 GHz WLAN, when five APs are required to receive information sent by the mobile terminal, if the associated AP of the mobile terminal uses channel 1, and two unassociated non-neighboring APs using channel 1 can also receive the information of the mobile terminal, only two unassociated neighboring APs, instead of all the four unassociated neighboring APs, need to perform channel switching, thereby reducing the impact on the working state of the network. Certainly, to improve locating accuracy, all the four unassociated neighboring APs may perform channel switching. This is not limited by the present invention.

Alternatively, the preset selection condition may be a maximum number of unassociated neighboring APs required for implementing the application service by the server and the unassociated neighboring AP is selected according to the maximum number. For example, for locating of the mobile terminal, if more APs can acquire location information of the mobile terminal, the mobile terminal can be located better and more accurately; however, considering the impact on the working state (such as the busy degree) of the network, during selection of the unassociated neighboring AP requiring switching, on the premise of not affecting the working state of the network, the maximum number of unassociated neighboring APs are selected for channel switching.

It should be noted that during the selection of unassociated neighboring APs requiring switching, preferentially idle unassociated neighboring APs are selected for network switching to further reduce the impact on the working state of the network; in addition, to locate the mobile terminal, preferentially unassociated neighboring APs distributed in different directions of the associated AP should be selected, in order to avoid selecting unassociated neighboring APs centralized in one direction of the associated AP and improve locating accuracy.

Figure 13:
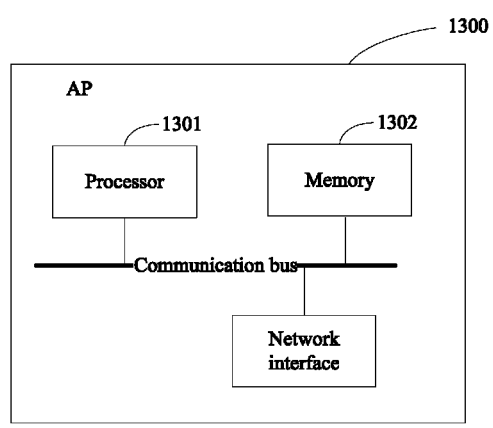
FIG. 13 is a schematic structural diagram of an AP according to an embodiment of the present invention.

FIG. 13 is a schematic structural diagram of an access point AP according to an embodiment of the present invention. As shown in FIG. 13, the AP 1300 includes a processor 1301 and a memory 1302. The processor 1301 and the memory 1302 may be connected by a bus or in other modes, and the memory 1302 stores program codes, where the program codes include operation instructions of a computer.

The processor 1301 executes the program codes, and is configured to: receive a switch request message sent by a controller, where the switch request message includes an identifier of a mobile terminal and a designated channel; switch from an original working channel to the designated channel and monitor the mobile terminal according to the identifier of the mobile terminal, where the designated channel is a working channel of the mobile terminal; and receive a message sent by the mobile terminal and acquire application information when monitoring the mobile terminal.

Further, the switch request message further includes a monitoring duration, and the processor 1301 is further configured to switch back from the designated channel to the original working channel after the monitoring duration expires.

Alternatively, the processor 1301 is further configured to: receive an information acquiring request message sent by the controller, where the information acquiring request message includes the identifier of the mobile terminal; send a probe message to the mobile terminal according to the identifier of the mobile terminal, so that the mobile terminal sends a response message after receiving the probe message; and receive the response message sent by the mobile terminal and acquire application information.

Further, the information acquiring request message further includes a probe count, and the processor 1301 is further configured to send the probe message to the mobile terminal according to the probe count.

The processor 1301 is further configured to send the application information to the server, where the application information includes: an RSSI and the identifier of the mobile terminal.

A person of ordinary skill in the art should understand that, all or part of the steps of the foregoing method embodiments may be implemented by a program instructing relevant hardware. The foregoing program may be stored in a computer readable storage medium. When the program runs, the above steps included in the method embodiments are performed. The foregoing storage medium may be any medium capable of storing program codes, such as a ROM, a RAM, a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for acquiring application information in a wireless local area network (WLAN), the method comprising:

sending, by a controller, an information acquiring request message to an associated access point (AP) of a mobile terminal, wherein the information acquiring request message comprises an identifier of the mobile terminal and a probe count, where the probe count is an integer greater than 1, so that the associated AP repeatedly sends a probe message to the mobile terminal the probe count times, and the mobile terminal sends a response message every time it receives the probe message; and sending, by the controller, a switch request message to an unassociated neighboring AP, wherein the switch request message comprises the identifier of the mobile terminal, a monitoring duration and a designated channel, to trigger the unassociated neighboring AP to switch from an original working channel of the unassociated neighboring AP to the designated channel, monitor the mobile terminal according to the identifier of the mobile terminal so as to receive from the mobile terminal the response message to acquire application information, and switch back from the designated channel to the original working channel of the unassociated neighboring AP after the monitoring duration expires, wherein the designated channel is a working channel of the mobile terminal.

2. The method according to claim 1, wherein before the controller sends the switch request message to the unassociated neighboring AP of the mobile terminal, the method further comprises:

receiving, by the controller, a service request message sent by a server, wherein the service request message comprises the identifier of the mobile terminal; and determining the unassociated neighboring AP according to a preset selection condition.

3. A controller, comprising:

a processor and a memory storing instructions, the processor being configured to execute the instructions to perform operations of:

sending an information acquiring request message to an associated access point (AP) of a mobile terminal, wherein the information acquiring request message comprises an identifier of the mobile terminal and a probe count, where the probe count is an integer greater than 1, so that the associated AP repeatedly sends a probe message to the mobile terminal the probe count times, and the mobile terminal sends a response message every time it receives the probe message; and sending a switch request message to an unassociated neighboring AP, wherein the switch request message comprises the identifier of the mobile terminal, a monitoring duration and a designated channel, to trigger the unassociated neighboring AP to switch from an original working channel of the unassociated neighboring AP to the designated channel, monitor the mobile terminal according to the identifier of the mobile terminal so as to receive from the mobile terminal the response message to acquire application information, and switch back from the designated channel to the original working channel of the unassociated neighboring AP after the monitoring duration expires, wherein the designated channel is a working channel of the mobile terminal.

4. The controller according to claim 3, wherein the processor is further configured to perform:
receiving, before the sending the switch request message to the unassociated neighboring AP of the mobile terminal, a service request message sent by a server, wherein the service request message comprises the identifier of the mobile terminal; and
determining the unassociated neighboring AP according to a preset selection condition.

5. An access point (AP), comprising:
a processor and a memory storing instructions, the processor being configured to execute the instructions to perform operations of:
receiving a switch request message sent by a controller, wherein the switch request message comprises an identifier of a first mobile terminal, a monitoring duration and a designated channel, wherein the AP is an unassociated neighboring AP of the first mobile terminal;
switching from an original working channel of the AP to the designated channel and monitoring the first mobile terminal according to the identifier of the first mobile terminal, wherein the designated channel is a working channel of the first mobile terminal;
receiving a first response message sent by the first mobile terminal and acquiring application information according to the first response message when monitoring the first mobile terminal;
switching back from the designated channel to the original working channel after the monitoring duration expires;
receiving an information acquiring request message sent by the controller, wherein the information acquiring request message comprises an identifier of a second mobile terminal and a probe count, where the probe count is an integer greater than 1, wherein the AP is an associated AP of the second mobile terminal; and
repeatedly sending a probe message to the second mobile terminal the probe count times, so that the second mobile terminal sends a second response message every time it receives the probe message.

6. The AP according to claim 5, wherein the processor is further configured to perform:
sending the application information to a server, wherein the application information comprises a received signal strength indicator RSSI and the identifier of the mobile terminal.

* * * * *